Oct. 19, 1965  A. J. LEWUS  3,212,426
APPARATUS FOR COOKING
Filed April 5, 1963  3 Sheets-Sheet 1
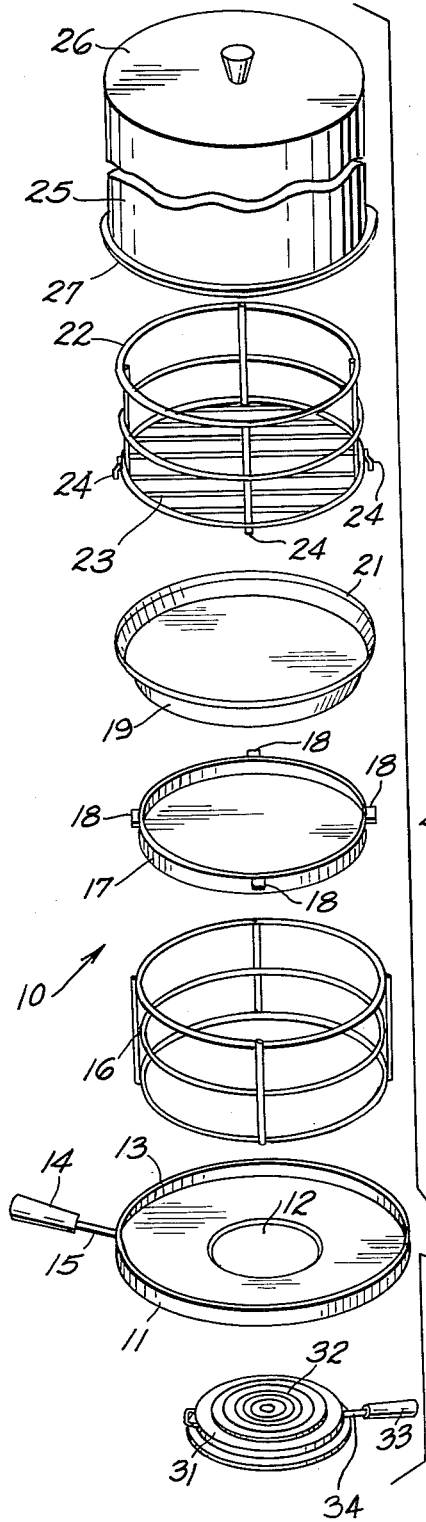
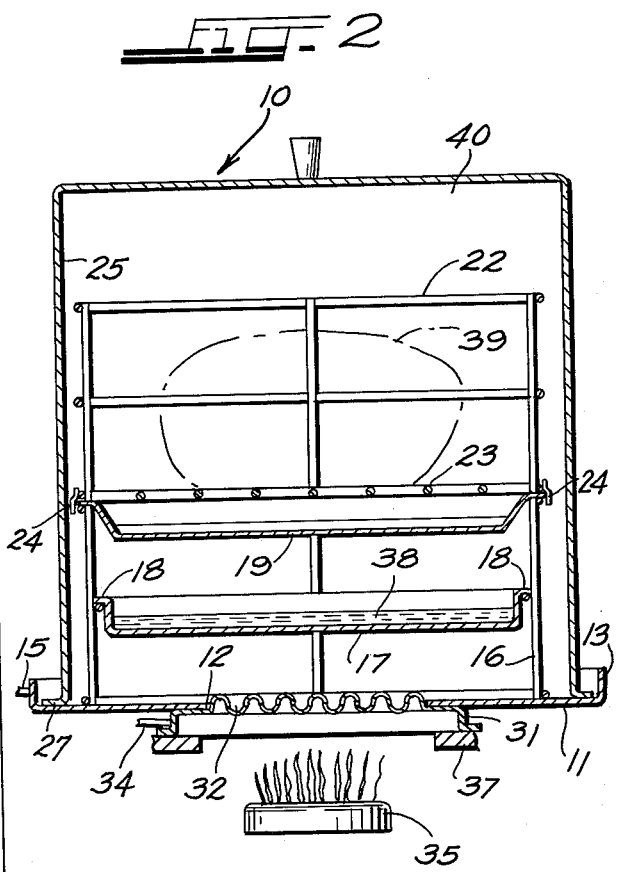
INVENTOR.
ALEXANDER J. LEWUS
BY
Wallace, Kinzer & Horn

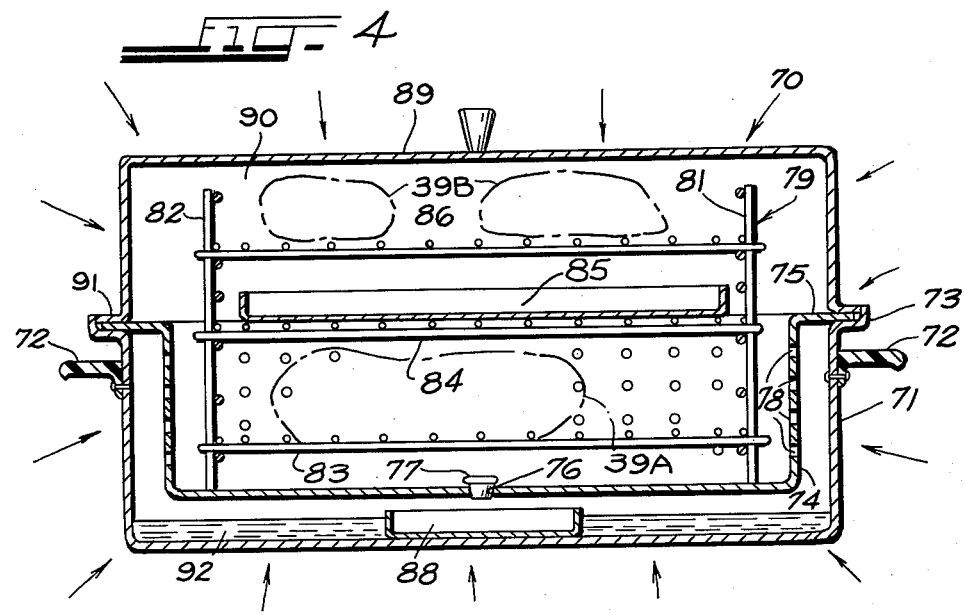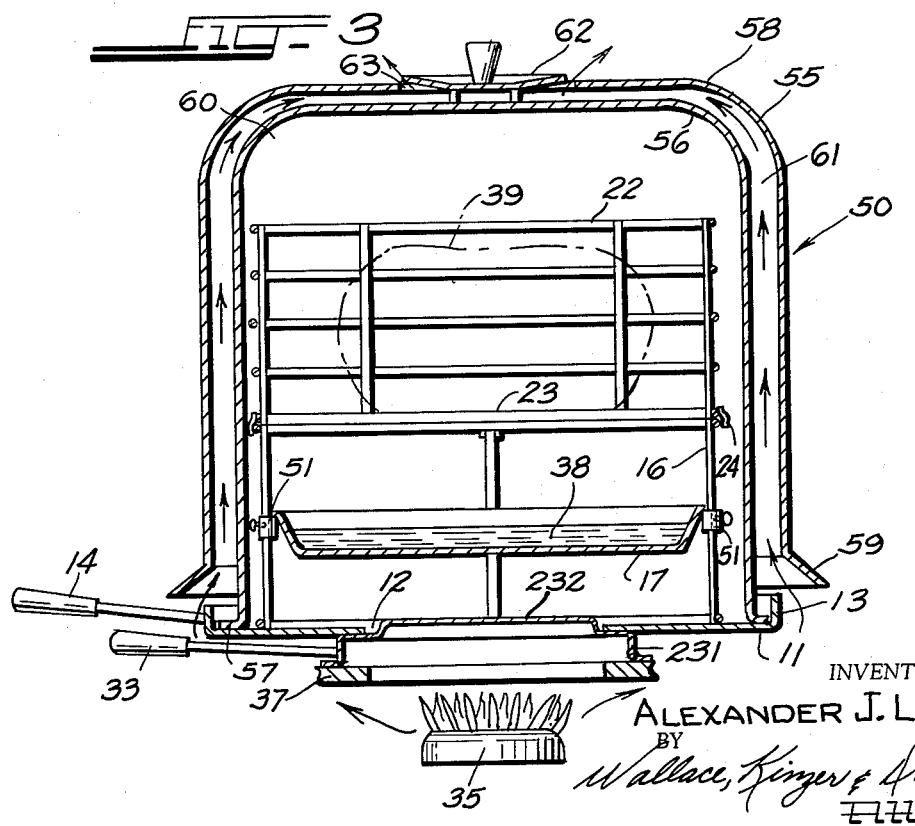

Oct. 19, 1965 A. J. LEWUS 3,212,426
APPARATUS FOR COOKING
Filed April 5, 1963 3 Sheets-Sheet 3
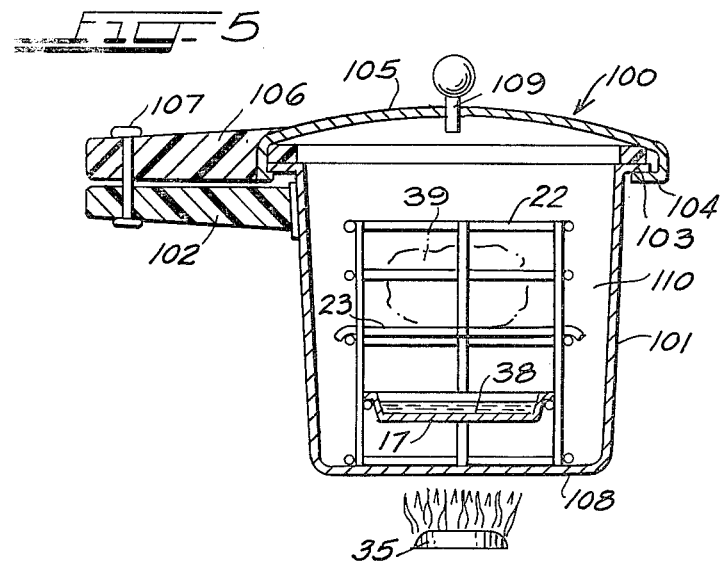
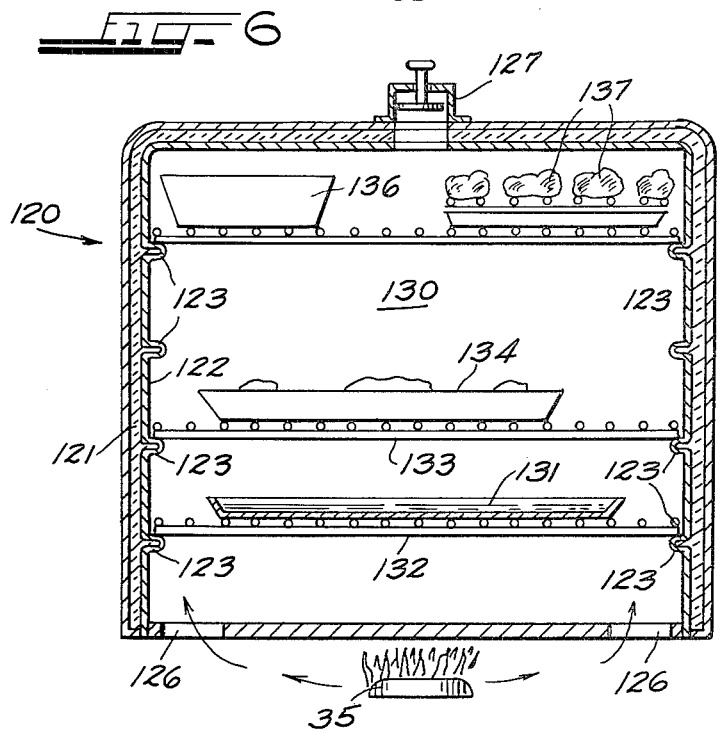
INVENTOR.
ALEXANDER J. LEWUS
BY
Wallace, Kinzer & Dow
ATT'YS.

United States Patent Office 3,212,426
Patented Oct. 19, 1965

3,212,426
APPARATUS FOR COOKING
Alexander J. Lewus, 1617 S. 47th Court, Cicero, Ill.
Filed Apr. 5, 1963, Ser. No. 270,840
7 Claims. (Cl. 99—339)

This invention relates to a new and improved apparatus for cooking meat, vegetables and other food items to afford maximum preservation of nutritional values and at the same time to afford superior taste qualities in the cooked food.

Two of the basic cooking processes, usually considered to be substantially incompatible with each other, may be broadly described as dry cooking and wet cooking. In dry cooking, such as baking, broiling, or the like, the natural juices of the food being cooked are frequently evaporated and lost, with a resultant reduction in nutritional values and in vitamin content. In addition, the food may be rather dry and tough when cooking is completed, particularly with respect to meats. In wet cooking processes, on the other hand, where a substantial quantity of water is introduced in the course of the cooking procedure, a substantial loss in flavor and in nutritional value may be occasioned by excess moisture leaching out the food.

It is a principal object of the present invention to afford a new and improved apparatus for cooking food that is effective to retain the natural moisture in the food and to avoid loss of flavor and nutritional values either by excessive evaporation or by introduction of excessive moisture into the cooking process.

A specific object of the invention is to provide a new and improved cooking apparatus that first cooks the food in a dry condition and subsequently introduces a limited quantity of moisture, in the form of steam or superheated steam, to maintain the desired moisture content in the cooked food.

It is a particular object of the invention to afford a new and improved dry- and wet-cooking apparatus that does not require introduction of water into the cooking chamber at any intermediate stage in the cooking process, or any other manipulation of the food once cooking has started.

Another object of the invention is to provide a new and improved apparatus for cooking a variety of different foods within the same chamber, simultaneously, without substantial interchange of flavors between the foods.

Another object of the invention is to provide a new and improved apparatus for achieving the benefits of oven cooking over an open flame or other similar heat source.

A specific object of the invention is to provide a new and improved heat transfer element for use in a cooking apparatus.

Another object of the invention is to achieve the major benefits and advantages of pressure cooking without subjecting the food being cooked to saturation by steam, the food being at least partially dry cooked before pressure cooking is initiated.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 1 is an exploded perspective view of cooking apparatus constructed in accordance with one embodiment of the present invention;

FIG. 2 is a sectional view illustrating the apparatus of FIG. 1 assembled for cooking of food;

FIG. 3 illustrates a modification of the embodiment of FIGS. 1 and 2 that affords the benefits of oven heating over an open flame or similar heat source;

FIG. 4 is a sectional view of cooking apparatus constructed in accordance with a second embodiment of the present invention, intended for use in an oven or like heated enclosure;

FIG. 5 illustrates a further embodiment of the invention, in sectional view, affording a modified form of pressure cooker; and FIG. 6 illustrates an additional embodiment of the present invention in which the basic enclosure is afforded by an oven of conventional construction.

The cooking apparatus 10 illustrated in FIGS. 1 and 2 comprises a flat annular support member 11 preferably constructed from relatively heavy gauge enamelled steel, stainless steel, or aluminum. Support member 11 is provided with an enlarged central opening 12. The peripheral portion of the support member includes an upwardly extending flange 13 that is relatively small in height. A handle 14 is mounted upon the support member flange by suitable means such as an extending shaft 15.

The cooking apparatus 10 further includes a first open rack 16 that is substantially smaller in size than the support member 11, so that the rack fits well within the peripheral portion of the support member as defined by flange 13. A shallow water pan 17 is mounted within rack 16, the water pan being supported a short distance above support member 11 as shown in FIG. 2. Pan 17 may be provided with a plurality of lugs 18 to engage rack 16 and thus mount the water pan in the desired operating position.

In the preferred embodiment of FIGS. 1 and 2, a second pan 19 is mounted on the top of rack 16 when the entire apparatus is assembled for cooking. The pan 19 may be provided with support lugs such as the lugs 18 of the water pan; in the illustrated arrangement, however, the second pan 19 is supported by means of an outwardly extending flange 21.

The next member of the assembly shown in FIG. 1 is a second open rack 22. Rack 22 is similar to rack 16 but is provided with a grill or grating 23 across the bottom of the rack. Rack 22, which is the food rack for the cooking apparatus, includes a plurality of mounting clips 24 that make it possible to mount rack 22 on the top of rack 16, above pan 19. The cooking apparatus of FIGS. 1 and 2 further includes a cylindrical cover 25, the top of the cover 25 being completely enclosed. The base or open end of the cylindrical cover 25 may have a relatively short radial flange 27 that fits within the peripheral flange 13 of base member 11. Thus, when the cooking apparatus is assembled (FIG. 2), the base flange 27 of the cover is seated upon the flat upper surface of support member 11.

In the preferred construction illustrated in FIGS. 1 and 2, the apparatus 10 also includes a heat transfer member 31. The heat transfer member is generally flat in configuration, but the peripheral portion of the heat transfer member is provided with a re-entrant flange to afford rigidity to the member. The upper surface of heat transfer member 31 is a corrugated heat transfer element 32 fabricated from metal of relatively high conductivity as, for example, stainless steel, which may be copper-clad. The heat transfer member is provided with a handle 33 mounted upon a projecting shaft 34.

Cooking apparatus 10 is utilized in conjunction with a localized heat supply, heating the interior of the cooking apparatus. In the assembled view of FIG. 2, the heat supply is shown as a gas burner 35 of conventional construction. It should be understood, however, that the gas burner 35 is not essential to operation of the invention. If preferred, an electrical heat source may be used, on the cooking apparatus may be employed with a charcoal fire, a wood fire, or any other suitable heat source.

In the cooking apparatus 10, as shown assembled in FIG. 2, the water pan 17 is located below the food 39. The reverse arrangement can be used to equal advantage, however, positioning the water pan above the food, particularly where the moisture content of the food is relatively high. The top positioning of the water supply, with bottom heating of the cooker as in FIG. 2, tends to lengthen the dry heat portion of the cooking cycle, compared to the moist heat cycle, but the basic cooking method remains the same.

FIG. 2 illustrates the cooking apparatus 10 assembled for use in accordance with the method of the present invention. Initially, the heat transfer member 31 is positioned above the gas burner or other heat source 35, being supported on a suitable frame such as the stove frame 37. Support member 11 is mounted above the heat transfer member, with the central corrugated portion 32 of the heat transfer member projecting through the central opening 12 in the support member. Rack 16 is then placed upon support member 11, in generally centered location with respect to opening 12, and the water pan 17 is mounted in rack 16. Water pan 17 carries a relative small supply 38 of water.

Continuing with the assembly, pan 19 is mounted in position above pan 17 and the second rack 22 is then mounted in place at the top of the assembly. A roast, vegetables, or other food items to be cooked are located in rack 22, being supported by the grill 23 at the bottom thereof. In FIG. 2 the position of the food is generally indicated by the phantom outline 39. Finally, the cylindrical cover 25 is mounted in place, affording a closed cooking chamber 40 encompasing the entire rack assembly 16, 22 and the pans 17 and 19.

In the initial portion of the cooking cycle, with the apparatus assembled as in FIG. 2, heat from source 35 is applied to transfer member 31 and particularly to the corrugated central heat transfer element 32 of this member. The convolutions of the heat transfer element 32 afford a relatively large surface area within the central lower portion of the cooking chamber 40 that is enclosed by cover 25 and base member 11. Consequently, the air at the bottom central portion of the cooking chamber is heated relatively rapidly. This localized heating establishes convection currents within the chamber, the hot air rising around water pan 17 and impinging upon the food 39 supported upon rack 23. Thus, at the outset, the food is dry cooked by the hot air within chamber 40.

Of course, a substantial portion of the heat from transfer member 32 is radiated to and is also carried by convection to water pan 17. At first, evaporation from pan 17 is quite slow, since it is necessary to raise the water in the pan to boiling temperature. Thus, despite the fact that water is present in the cooking chamber 40 at the outset of the cooking cycle, it does not materially increase the moisture content of the air and does not add an appreciable amount of moisture to the food 39 during the early part of the cooking.

Subsequently, however, the water 38 in pan 17 is heated to an extent sufficient to provide for rapid evaporation. As a consequence, a limited amount of steam is formed within chamber 40, and this steam circulates within the chamber and impinges upon the food 39. Thus, during the latter stages of the cooking cycle, the food is subjected to a limited form of "wet cooking." Some of the steam may condense on food 39, if the food is still below the boiling temperature for the water. Any condensed moisture on the food falls into pan 19 and, accordingly, is not returned to the initial water supply in pan 17. In this manner the moisture content within the chamber 40 is held at a minimum at all times and excessive water cooking is precluded. Moreover, the temperature within chamber 40 frequently exceeds boiling temperature, so that the wet cooking is carried out with super-heated steam.

The cyclic operation described above, when the food 39 is subjected to a dry heating cycle and subsequently to a moist heating cycle, effectively preserves the nutrients in the food and avoids the losses ordinarily presented by excessive dry cooking or excessive wet cooking. Food cooked in accordance with the invention has a fresh, clean taste. Furthermore, the length of time for the cooking is not as critical as in some prior art cooking processes; although the food 39 may be cooked to a somewhat greater extent than necessary for the particular food, there is no drying out as with ordinary baking or roasting procedures and there is no leaching out of flavor, or sogginess, as sometimes occurs with conventional wet cooking procedures.

It is not essential that all of the components of cooking apparatus 10 be used in each cooking cycle. For example, it may be desirable to cook the food 39 over a charcoal fire in a manner such that a smoke flavor may be imparted to the food. In these circumstances, support member 11 may be located directly over the charcoal fire, with heat transfer member 31 omitted from the assembly, in order to permit the charcoal smoke to penetrate chamber 40 to a limited extent. The same technique can be utilized with an electric heat source, since a source of this kind will not produce objectionable flavors in the cooked food.

FIG. 3 illustrates another cooking apparatus 50 that is generally similar, in many respects, to the cooking apparatus 10 of FIGS. 1 and 2, but is modified to constitute another embodiment of the present invention. The cooking apparatus 50 again includes the support member 11, with its central aperture 12 and peripheral flange 13. As before, the support member 11 may be mounted upon a heat transfer member 231 having a central heat transfer element 232 disposed within the opening 12 in the support member; in this instance the heat transfer element is of planar construction and is not corrugated. Cooking apparatus 50 is again a top-of-the-stove or like cooking device with heat provided from a source 35 located below heat transfer member 131.

As before, the internal portion of cooking apparatus 50 comprises a first rack 16 which supports a shallow water pan 17 containing a limited supply 38 of water. A second open rack 22 is mounted upon rack 16 and the food 39 to be cooked is disposed upon the grill 23 at the bottom of rack 22. In this instance, the mounting arrangement for the water pan 17 is slightly different, the water pan being supported upon a plurality of adjustable stop members 51 mounted upon the vertically extending legs of rack 16. As in the previous embodiment, a series of clips 24 may be used to mount the upper rack on the lower rack.

The cover 55 of the cooking apparatus 50, however, is quite different in construction from the cover 25 in the embodiment of FIGS. 1 and 2. Thus, as shown in FIG. 3, cover 55 includes an internal dome-shaped cover 56 that is provided with a peripheral flange 57 that seats the cover on support member 11. A second dome-shaped cover element 58 is mounted upon member 56 in encompassing spaced relation thereto. The outer cover 58 is provided with a flared lower rim 59 that projects outwardly beyond the peripheral flange 13 on the support member. Thus, the two members 56 and 58 forming cover 55 afford a combined air space 61 around the enclosed chamber 60 defined by support member 11 and cover 55. The air space 61 is vented to the atmosphere by means of an adjustable damper 62 covering a central opening 63 in the outer cover member 58.

In operation, cooking apparatus 50 is set up in much the same manner as the previously described cooking apparatus 10. The heat transfer member 231 is disposed over the heat source 35 and support member 11 is mounted on the heat transfer member. The lower rack 16 bearing water pan 17 is mounted on the support member and the food 39 is mounted above the water pan by means of rack 22. The cover assembly 55 is then mounted in position on support 11, as shown, enclosing the cooking chamber 60.

With heat supply 35 in operation, the interior of chamber 60 is heated at the central bottom location by radiation and conduction from transfer element 232. The locally heated air establishes convection currents within chamber 60 and initiates dry cooking of food 39. At the same time, heated air from source 35 passes into the space 61 between the two cover members 56 and 58, heating the chamber 60 further by conduction through member 56 and, to a limited extent, by radiation from member 56. Damper 62 is opened slightly to assure some circulation through the space 61.

In the initial portion of the cooking cycle, the limited supply of water 38 in pan 17 evaporates quite slowly, since the water is not yet up to boiling temperature. Subsequently, and after a substantial period of dry cooking, the water 38 is evaporated at a more accelerated rate and thus develops a quantity of steam within chamber 60 that continues cooking food 39 by a wet process. As before, the amount of water is kept quite small to avoid leaching out the flavor and nutritional elements from food 39. In this instance, the drip pan 19 (FIG. 2) is not used, but a drip pan may be employed if desired. As in the previous embodiment, the wet cooking procedure is carried out with super-heated steam, since the interior of chamber 60 is heated above the normal boiling point for water 38.

FIG. 4 illustrates a cooking apparatus 70 intended for use in a pre-heated oven and, accordingly, constituting a roaster embodiment of the present invention. Cooking apparatus 70 includes a base member 71 that constitutes the main support member for the apparatus. Base member 71 may be essentially similar to the bottom half of a conventional roaster and may be provided with a pair of handles 72. The upper rim of base member 71 is formed in a flange 73, and a relatively large pan 74 is mounted upon flange 73 by means of a rim 75 on the pan. Pan 74 is provided with a central opening 76 that may be closed with a plug 77. In addition, the upper walls of pan 74, which are quite deep, are provided with a plurality of openings 78.

A rack 79 is mounted within and is supported by pan 74. Rack 79 includes two vertically extending multiple bar racks 81 and 82 rigidly connected to a bottom grill 83 that is a fixed part of the rack. The bottom grill 83 is utilized to support a roast or other food 39A to be cooked in the apparatus 70.

A second support grill 84 is mounted upon rack 79, extending between the vertical lugs 81 and 82 of the rack. A drip pan 85 is mounted upon grill 84. Above grill 84, another grill 86 is mounted between the two vertical legs of rack 79. This additional grill supports further food items 39B to be cooked in the apparatus.

In the bottom of cooking apparatus 70, a small gravy collection pan 88 may be mounted immediately below opening 76 in the pan 74.

The cover 89 of cooking apparatus 70 is substantially similar to the top cover of a conventional roaster. The cover is provided with a supporting flange 91 that is seated in the flange 73 of the lower or support half 71 of the apparatus.

When cooking apparatus 70 is to be placed in use, a small quantity of water 92 is introduced into the lower section of the roasting pan, section 71, affording a limited reservoir of moisture within the roaster. Pan 74 is then mounted in place, as shown in FIG. 4, and the rack 79 is positioned within pan 74. The lower portion 39A of the food to be cooked is disposed in its cooking position on grill 83. Grill 84 is then placed in the rack and pan 85 is positioned on the grill, after which the upper grill 86 is mounted in place on the rack and the remaining food 39B is positioned for cooking. It will be recognized that the food 39A and 39B, the two removable racks 84 and 86, and the pan 85 may be mounted in rack 79 before the rack is placed in pan 74. Cover 89 is then positioned on the apparatus, totally enclosing chamber 90, and the apparatus is placed in a pre-heated oven for cooking.

When the cooking apparatus 70 is first placed in the oven, the air within chamber 90 is heated by conduction through the lower and upper portions 71 and 89 of the apparatus that enclose chamber 90. Consequently, the food 39A and 39B is first heated in dry condition before any substantial quantity of water 92 can be evaporated. Subsequently, water 92 is evaporated and moisture passes through the opening 78 in pan 74 and circulates through chamber 90 to contact the food. But only a very limited quantity of water is used, so that the food is not saturated. Furthermore, the restrictive circulation between the water in the bottom of pan 71 and the foods, suspended well above the water and partially enclosed by pan 74, limits the amount of moisture received at any given time by the foods.

Pan 85 prevents condensed moisture from food 39B from falling into contact with the lower food 39A. This pan also prevents the return of drippings to the initial water reservoir in the bottom of the support member pan 71. The drippings from food 39A are retained in the base of pan 74, which thus functions as a drip pan. After cooking is completed, this pan may be conveniently drained into the small gravy pan 88, by removing plug 76, so that the drippings may be retained for making gravy or other purposes.

In a given application, using cooking apparatus 70, it may be desirable to prepare a roast, which would usually be mounted in the position indicated by phantom outline 39A, and at the same time to cook vegetables to be served with the roast, the vegetables being located at positions 39B. On the other hand, it may be desirable to prepare a stew, in which case the meat and vegetables to be prepared with it are disposed in a pan within chamber 90. The circulating moisture from supply 92 to the cooking foods is adequate to prepare a dry stew, without leaching out the flavor and nutritional values of the stewed foods. In the use of the cooking apparatus 70 of FIG. 4, the plug 76 and pan 88 may also be omitted, at the time the food is placed in the cooker, to permit moisture condensing in chamber 90 to return to the initial supply 92 if desired.

FIG. 5 illustrates a further embodiment of the present invention comprising a cooking apparatus 100 that in many respects is quite similar to the cooking apparatus 50 of FIG. 3. In the cooking apparatus 100, FIG. 5, the basic enclosure means comprises a pressure cooker having a deep base 101 that also constitutes the support member for the pressure cooker. The base member 101 of the cooking apparatus is provided with a fixed handle 102. The upper rim of the base member 101 is provided with an external flange 103. Flange 103 is engaged by a mating flange 104 on a lid or cover member 105. A handle 106 is provided on the cover member 105 and may be secured to handle 102 to latch the cover in closed position, by suitable means such as a latch member 107. The particular construction utilized for the mounting of cover 105 on base member 101 is not critical to the present invention and the cover and base members may be provided with any suitable interlocking apparatus and sealing means, including those now used in commercially available pressure cookers.

Within the pressure cooker 101, 105, the cooking apparatus 100 is provided with an interior rack and water pan assembly essentially similar to that shown in FIG. 3. Thus, the lower rack 16 again rests upon the bottom wall 108 of the support member 101. A shallow water pan 17 is supported midway of the rack 16 and carries a limited reservoir of water 38. Above the water pan 17, a second rack 22 is utilized to support the food 39 that is to be cooked. Again, the cooking apparatus is employed in conjunction with an external heat source 35 that is disposed below the bottom of the cooker. As in the earlier embodiments, the relative positions of the food and water pan can be reversed, placing the water pan above the food.

Operation of the pressure cooking apparatus of FIG. 5 is essentially similar to that shown in FIG. 3. With the cooker assembled as shown, heat applied to the bottom 108 of the apparatus heats the interior chamber 110 that is enclosed by support member 101 and cover 105. Initially, the food 39 is heated dry, since the water 38 is below its boiling temperature. This dry heating continues much longer than with ordinary pressure cooking apparatus because of the substantial spacing between the water and the heated bottom wall of the cooker. Subsequently, however, the water 38 reaches boiling temperature and is vaporized, releasing a limited quantity of steam within the chamber 110. This steam becomes super-heated as the temperature rises above the boiling temperature of the water, so that wet cooking is continued, after the dry cooking of the initial stage, with the super-heated steam.

As in any pressure cooker, it is desirable to afford a steam pressure release valve, as indicated by the pressure outlet 109 in the cover 105. However, the limited quantities of water converted to steam in the pressure cooker ordinarily do not produce excessive pressure. The embodiment of FIG. 5 affords somewhat more rapid cooking, as in the case of any pressure cooker, when compared with unpressurized cooking apparatus. However, it preserves the basic advantages of the invention in providing for an initial dry cooking period followed by a moist cooking cycle.

FIG. 6 illustrates another cooking apparatus 120 that is closely related to the apparatus of FIG. 3 in many respects. In this instance, the basic enclosure is afforded by an insulated oven-like enclosure 121 having internal walls 122 each provided with a series of rack-supporting projections 123. The lowest of these rack projections 123 are located well above the bottom of the enclosure, which comprises a relatively heavy metal plate 124. The chamber 130 enclosed by the enclosure means 120 is heated from an external source, again shown as a gas burner 35 although any other desired heating source may be employed. The burner 35 is disposed below the bottom plate 124 of the cooking apparatus. Access openings 126 are afforded around the periphery of plate 124 to permit heating of the chamber 130, by convection, from source 35. An adjustable damper 127 is provided at the top of the chamber to permit effective control of the circulating hot air currents within the chamber.

Within chamber 130 a shallow waterpan 131 is mounted upon a rack 132 near the bottom of the chamber but spaced well above the bottom plate 124. Above the water pan 131, a further rack 133 supports a part of the food to be cooked within the enclosure 130. In this instance the food being cooked comprises dry stew ingredients disposed within a pan 134 that is supported upon rack 133. In addition, another open rack 135 is disposed within chamber 130 above the food in pan 134. Rack 135 may support food to be cooked in liquid state, as in the container 136. The same rack may be employed to support additional food to be cooked in dry condition as indicated at 137.

The cooking cycle for apparatus 120 is essentially similar to that of the previously described embodiments. Initially chamber 130 is heated from source 35, primarily by convection currents through the openings 126 in bottom plate 124, which convection currents circulate through the chamber and out through adjustable damper 127. Thus, the initial portion of the cooking cycle entails dry heating of the food 134, 136 and 137.

When the water in pan 131 reaches boiling temperature, moisture is released into the cooking chamber and the cooking is continued in a wet process. As before, the water supply is quite limited, so that excessive moisture is not added to the food and the flavor and nutrition are not leached out. Any moisture condensing within the chamber, on the food, is confined to the food on which it condenses and is not permitted to transfer back to other food within the chamber.

In all of the foregoing embodiments, the basic cooking cycle is the same. Initially, the food is heated dry. Subsequently, moisture is introduced into the enclosure around the food to continue cooking on a moist basis, but the amount of moisture added in each instance is quite limited. The disposition of the water supply within the cooking chamber prevents immediate vaporization of the water and thus preserves the dry-wet sequence required in accordance with the invention.

The nature of the terminal portion of the cooking cycle, using any of the cooking devices shown in FIGS. 1 through 6, is dependent to some extent upon the temperature within the cooking chamber. If the temperature of the chamber does not exceed approximately 225° F., in the later part of the cooking cycle, then the final cooking is, in effect, a moist cooking process. But if the temperature is raised substantially above 225° F., then the vaporized moisture within the chamber is superheated to a substantial extent and the final portion of the cooking cycle is, in effect, a dry cooking or baking step. Thus, where relatively high temperatures are provided, the complete cycle entails initial dry heating, followed by a moist heating period as the water evaporates, succeeded by a further dry cooking or baking process. The latter procedure, employing quite high temperatures, is particularly desirable where the food is to be browned in the course of the cooking process. In any case, substantially all of the surface area of the food is subjected to the same cooking cycle, without turning the food and without basting or other like procedures. Varying degrees of moist and dry cooking are achieved, as described in detail above.

In the present invention, as described hereinabove, substantially pure water may be utilized as the moisture producing medium within the cooking chamber. This is the desired procedure when the basic natural taste of the food is to be preserved without substantial change. However, if it is desired to impart an additional flavor to the food being cooked, this can be readily accomplished, in many instances, by incorporating the flavoring agent in the pan of liquid within the cooking chamber, as an addition to or instead of the water that is normally used. For example, the flavor of various foods may be materially altered, to suit the taste of the user, by substituting fruit juices such as pineapple juice, orange juice, prune juice or apple cider, for the water supply in the cooking apparatus. By the same token, wine or other similar beverages may be employed, instead of pure water, in the cooking process. One particular flavoring procedure that produces interesting and flavorful results is the incorporation of a substantial amount of honey in the water that is used in the cooking process. Another flavoring liquid substitution that has been employed with success entails the use of cider vinegar, in substantial quantities, in the water supply. Accordingly, it should be understood that the present invention includes the use of flavoring liquids, and the term "water" as used in the succeeding claims embraces flavoring liquids as well as substantially pure water.

Hence, while preferred embodiments of the invention have been described and illustrated, it is to be understood that they are capable of variation and modification, and I therefore do not wish to be limited to the precise details set forth, but desire to avail myself of such

I claim:
1. Apparatus for cooking meat, vegetables, and other food items comprising:
   enclosure means having walls defining a closed, unvented cooking chamber adapted to be heated from a single external heat source located immediately adjacent the bottom of the enclosure means;
   support means for supporting food items in elevated cooking position within said chamber in position to be cooked by convection currents of dry air within said chamber, said supporting means constituting a wire rack that is open on all sides to permit the flow of convection currents all around the food;
   and a shallow water pan, positioned within said chamber between said cooking position and the bottom of said chamber and in spaced relation to said cooking position and the bottom of said chamber, for introducing a limited amount of moisture into the heated circulating air within said chamber only after dry cooking has been initiated, said water pan being substantially smaller in circumference than said enclosure to permit unobstructed flow of convection currents therearound.

2. Apparatus for cooking meat, vegetables, and other food items comprising:
   enclosure means having walls defining a closed, unvented cooking chamber adapted to be heated from a single external heat source located immediately adjacent the bottom of the enclosure means, said enclosure means comprising a relatively flat base member and a cylindrical cover, having a closed top wall, removably supported on said base member;
   support means for supporting food items in elevated cooking position within said chamber in position to be cooked by convection currents of dry air within said chamber, said supporting means constituting a wire rack that is open on all sides to permit the flow of convection currents all around the food;
   and a shallow water pan, positioned within said chamber between said cooking position and the bottom of said chamber and in spaced relation to said cooking position and the bottom of said chamber, for introducing a limited amount of moisture into the heated circulating air within said chamber only after dry cooking has been initiated, said water pan being substantially smaller in circumference than said enclosure to permit unobstructed flow of convection currents therearound.

3. Apparatus for cooking meat, vegetables, and other food items comprising:
   enclosure means having walls defining a closed, unvented cooking chamber adapted to be heated from a single external heat source located immediately adjacent the bottom of the enclosure means, said enclosure means comprising a relatively flat annular base member having a large central opening, a dome-like cover removably supported on said base member and a removable heat transfer member projecting upwardly into and closing off said central opening in said base member, said heat transfer member comprising a thin, relatively highly conductive sheet metal element affording rapid transfer of heat from said external heat source to the interior of said chamber;
   means for supporting food items in elevated cooking position within said chamber in position to be cooked by convection currents of dry air within said chamber, said supporting means constituting a wire rack that is open on all sides to permit the flow of convection currents all around the food;
   and a shallow water pan, positioned within said chamber between said cooking position and said heat transfer member and in spaced relation to said cooking position and said heat transfer member, for introducing a limited amount of moisture into the heated circulating air within said chamber only after dry cooking has been initiated, said water pan being substantially smaller than said enclosure to permit unobstructed flow of convection currents therearound.

4. Cooking apparatus according to claim 3 in which said thin conductive sheet metal is corrugated to increase the total surface area and thereby increase the rate of heat transfer.

5. Apparatus for cooking meat, vegetables, and other food items comprising:
   enclosure means defining a closed unvented cooking chamber adapted to be heated from an external heat source located beneath the base thereof, said enclosure means including a base member and a dome-like lid member supported on the base member with the rim of the lid member in continuous peripheral engagement with the base member;
   an open cylindrical wire rack of smaller external dimensions than the lid member, supported on said base member within the chamber;
   an open wire grid mounted upon said rack and extending across the rack in position to support food items at an elevated cooking position within said chamber and permitting cooking of the food items by the impingement of convection currents of dry air upon all sides of the food supported on the grid;
   and a shallow water pan, mounted on said rack within said chamber between said cooking position and said base member and in spaced relation to said cooking position and said base member, for introducing a limited amount of moisture into the heated circulating air within said chamber only after dry cooking has been initiated, said water pan being substantially smaller in circumference than said enclosure to permit unobstructed flow of convection currents therearound.

6. Cooking apparatus as defined in claim 5, in which said base member is provided with a large central opening for heating the interior of said chamber and further including a removable heat transfer member having a thin highly conductive corrugated sheet metal transfer element, projecting upwardly into and closing off said central opening in said base member but spaced from said water pan, to afford rapid heat transfer from outside the base of said chamber into the interior of said chamber.

7. Cooking apparatus as defined in claim 5, and further including a drip pan supported on said rack within said chamber between said cooking position and said water pan and in spaced relation to both, for collecting drippings from the food and preventing same from collecting in said water pan, said drip pan being substantially smaller in circumference than said enclosure to permit unobstructed flow of convection currents therearound.

References Cited by the Examiner

UNITED STATES PATENTS

| | | | |
|---|---|---|---|
| 588,440 | 8/97 | Jones | 126—369 |
| 918,656 | 4/09 | Chase | 126—369 |
| 1,012,869 | 12/11 | Lauzon | 126—369 |
| 1,702,854 | 2/29 | Simonds | 99—1 |
| 1,723,413 | 8/29 | Drehmann. | |
| 1,837,924 | 12/31 | Rutherford | 99—260 |
| 2,097,793 | 11/37 | Howell | 99—446 |
| 2,339,974 | 1/44 | Austin | 99—1 |
| 2,429,282 | 10/47 | Van Ness | 99—340 |
| 2,601,850 | 7/52 | Ames | 126—369 |

CHARLES A. WILLMUTH, *Primary Examiner.*

HYMAN LORD, LAWRENCE CHARLES, ROBERT E. PULFREY, *Examiners.*